Nov. 18, 1947.  A. J. QUINN  2,431,300
COVER FOR HINGED-JOINT GEAR-ASSEMBLIES
Filed Nov. 17, 1944  2 Sheets-Sheet 2
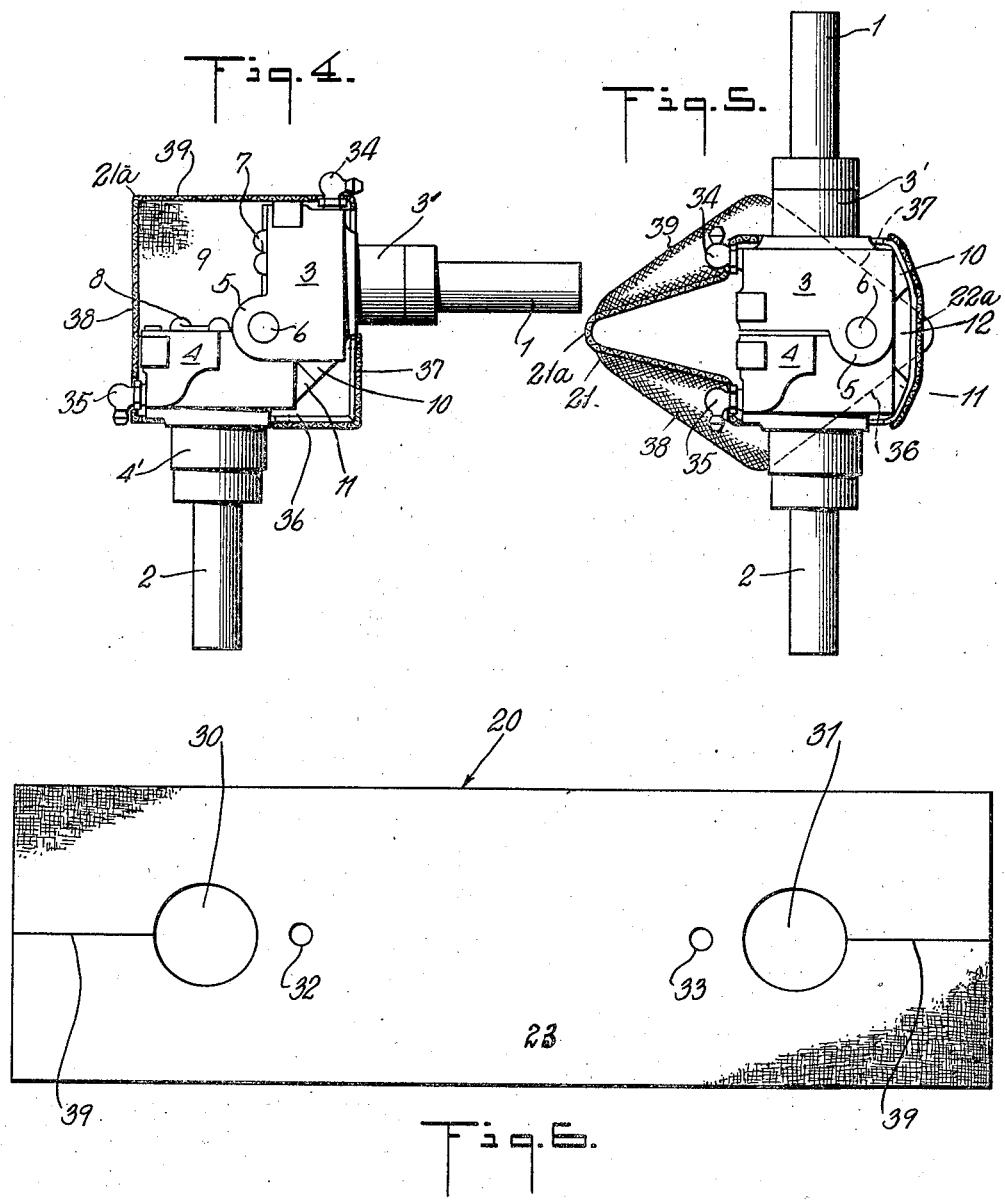

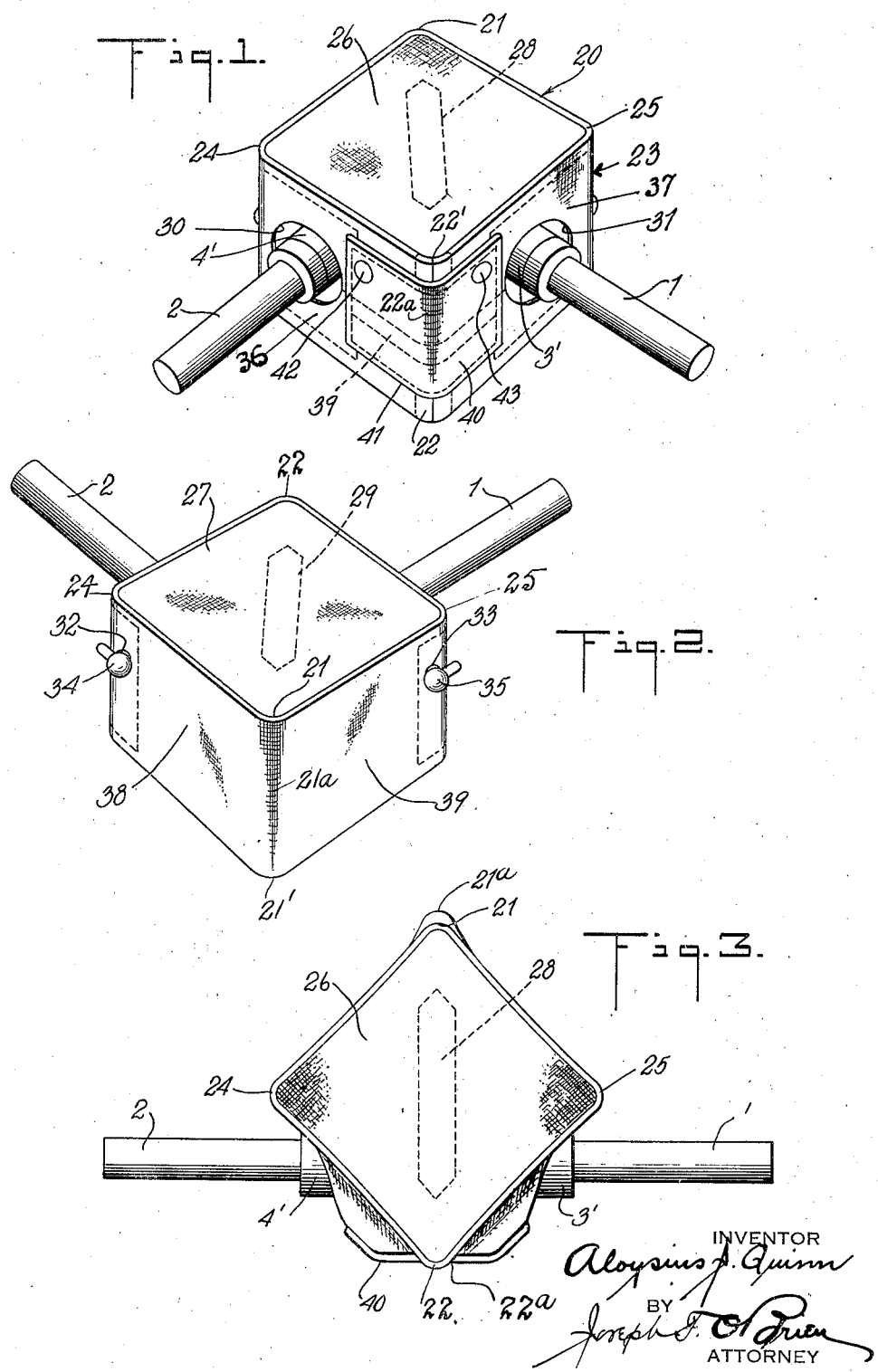

Patented Nov. 18, 1947

2,431,300

UNITED STATES PATENT OFFICE 2,431,300

COVER FOR HINGED-JOINT GEAR-ASSEMBLIES

Aloysius J. Quinn, North Bergen, N. J., assignor to Brooks Equipment Corporation, a corporation of New York Application November 17, 1944, Serial No. 563,946

4 Claims. (Cl. 74—606)

This invention relates to improvements in covers for hinged-joint gear-assemblies.

In hinged-joint gear-assemblies, the gear members are mounted in hinged housings movable about a hinge-pin, and in a well-known type, such as illustrated for example in patent to S. H. Brooks, No. 2,281,913, dated May 5, 1942, the housings and gears are movable in an arc of ninety (90) degrees. Such gears are often mounted in exposed positions and it is highly important to provide a cover therefor which will protect or guard the same during operation and movement in order to prevent insertion or entrance between the gear members of foreign matter which might cause jamming, failure of the gear assembly to function with various consequential results, rapid wear of the gear parts or breakage thereof; also an efficient cover will serve as a guard to prevent injury to and interference by workmen, and will prevent deterioration through exposure to the atmosphere and salt-water spray, etc. Such a cover should be effective in all operative positions of the gear assembly, as for example, when the gear members are operating at ninety degrees or right angles in relation to each other or when the gear members are arranged parallel to each other in complete abutment and interengagement with the operating shafts in axial alignment with each other. The hinged housings, in gears which open up to an angle of ninety degrees, are also provided at the side of the hinge-pin opposite to the gear-mounting portions with fixed pairs of contact or stop-blocks which move through a similar arc and contact with each other when the gear members and their mountings are moved to an angular limit of ninety degrees and these stop-blocks open up when the gear members are closed into parallelism with each other. The pair of gear members and the pair of contact blocks are thus arranged at opposite sides of the hinge-pin, and though of unequal dimensions, move through similar arcs into and out of abutment with each other.

Conventional cylindrical flexible or canvas gear covers cannot be used because during the movement of the gear and block parts, such covers move into the spaces between the pair of gear members and also into the space between the pair of contact or stop-blocks of the housings. A difficult problem was thus encountered in properly covering such hinge-joint assemblies with flexible material in order to prevent the movement of the cover into the operating spaces between the teeth of the pairs of said gear members or between the pair of stop blocks on the housing, and the problem was further compli- cated because the pairs of gear members and stop-blocks, being dissimilar in length and distance from the hinge-pin, consequently opened up unequal angular spaces at the opposite sides of the hinge-pin. With said conventional cylindrical covers, when one space is opened up, there occurs a drawing or movement of the flexible cover material into the opposite space and vice versa.

In accordance with my invention, I am enabled to provide a gear cover adapted particularly for gears of the type specified which will at all times maintain its covering position, and will not move into the aforesaid opened up spaces during operation or during any position of the gears or stop-blocks in such operation. In carrying out my invention, I utilize a cover having the shape of a parallelopiped with side walls of parallelogram conformation, and having angular movable hinge-corners disposed opposite and outside the arcs of movement of the gear members and of the stop blocks and arranged to function as outwardly-movable hinge-joints for the cover during the angular movement of the gear-assembly covered thereby while the intermediate corners of the parallelopiped move inwardly and approach each other.

Another feature of my invention is to utilize the gear housings and lubricating fittings as anchoring elements for suitably anchoring a gear assembly to its cover and I, therefore, provide apertures for portions of such housings and for the lubricating fittings in the wall of the gear cover arranged in positions remote from the outwardly-movable hinge-joints of the gear cover and adjacent to the inwardly-movable or approaching hinge-joints. Thus, during the angular movement of the gear-assemblies, the opposite anchored portions of the cover and the cover-corners adjacent thereto will approach each other and the adjacent wall portions at opposite sides of such approaching corners will be caused to swing in a substantially pivotal movement about the remote free corners of the cover, which corners will at all times maintain angular positions in relation to the gear members and stop-blocks and will move slightly in an outward direction, thus preventing such corners and the walls of the cover from moving into the space or interstices between the gear members. Such diagonally-opposite free corners thus maintain their positions in relation to the gear members and contact or stop-blocks during all positions of movement thereof. The arc of movement of the stop-blocks is shorter than the arc of movement of the peripheral edge of the gear member and while their movement likewise causes an outward hinging or pivotal movement about the corner of the gear cover diagonally opposite to the corner opposite the gear members, the angular movement of this stop-block corner is much less than the corner adjacent to the angular opening of the gear members, and I preferably slit this stop-block corner of the cover to enable application of the cover over the hinge-jointed gear-assembly.

Another object of my invention is to provide a cover construction which may be applied and removed speedily and easily and in which the lubricating fittings are always accessible.

With these and other objects in view, the invention comprises the combination of members and arrangement of parts so combined as to coact and cooperate with each other in the performance of the functions and the accomplishment of the results herein contemplated, and comprise in one of its adaptations the species or preferred form illustrated in the accompanying drawings, in which:

Fig. 1 is a view in perspective of a gear cover made in accordance with my invention and showing one position of the said cover and gear-assembly;

Fig. 2 is a view similar to Fig. 1 showing the gear cover and gear-assembly turned in the opposite direction;

Fig. 3 is a view in plan showing the position of the gear cover when the gear members and the shafts are moved into axial registration with each other;

Fig. 4 is a section somewhat reduced of the cover covering a gear-assembly with the gear members shown in open position;

Fig. 5 is a similar section to Fig. 4 showing my cover when the gear members are in closed position and the shafts in axial registration;

Fig. 6 is a view in plan of the peripheral or outside piece of my gear cover in which the compensating or movable angular joints are formed.

Referring now to these drawings, which illustrate a preferred embodiment of my invention, the shafts 1 and 2 have attached thereto gear housings 3 and 4 which are provided with two pairs of aligned ears 5 connected together by hinge pins 6, and each of the housings 3 and 4 house gear members 7 and 8, which are fixedly mounted on the shafts 1 and 2 to rotate therewith. It will be seen from an examination of Figs. 4 and 5 that the gear members 7 and 8 move from a position in which they extend at right angles to each other to a position in which the members are parallel to each other and the shafts are in axial registration. When the shafts are in the position shown in Fig. 4 an angular wide cavity of 90° is formed between the gear members 7 and 8 while the stop-blocks 10 and 11 are in contact, and when the gear members are moved into parallel abutting relationship with the shafts in axial alignment, the contact stop-blocks 10 and 11 will have between them a similar, though much smaller cavity or opening 12. In gear covers heretofore made, the flexible coverings entered the cavities 9 and 12, respectively, and thus prevented proper operation of the gear members 7 and 8, as it will be obvious that if any extraneous or foreign object is inserted between the gear teeth a proper contact and meshing thereof will not be possible, and on the other hand if any extraneous object is moved between the contact or stop blocks the gear elements will not be permitted to move through its proper arc and operation thereof will likewise be prevented. A problem was thus presented to produce a covering that would, at all times, be maintained out of the spaces or cavities 9 and 12.

In order to accomplish this result, I have provided a cover formed of flexible material such as heavy canvas and having a shape that, instead of following the arcuate line of movement of the gear members and of the stop-blocks, comprises a parallelopiped having sides comprising parallelograms, and I utilize two diagonally opposite corners of this cover as hinge joints which, when connected to the gear assembly, are compensated and move outwardly away from the hinge pin 6 upon the movement of the gear-assembly while the portions of the sides adjacent to the other two diagonally-opposite sides are cambered and move toward each other, as indicated by the shade lines in Fig. 3. These outwardly-moving hinged joint corners are preferably arranged outside the arcs of movement of the gear members and of the stop-blocks. Thus, in the drawings, I have shown a parallelopiped cover 20 in which the diagonally opposite corners 21 and 22 are utilized as the outwardly-moving compensating hinged joints. As illustrated, the cover 20 is composed of side-wall members 26 and 27 each having the shape of a parallelogram and a single-piece surrounding or peripheral member 23 which, as shown, has creases 21ᵃ—22ᵃ connecting the corners 21—21' and 22—22' of the side members. The inwardly-moving or approaching cover-corners 24—24' and 25—25' will be held in position by said side wall members 26 and 27 respectively, but these sides will be cambered adjacent to said corners 24—24' and 25—25' as above indicated.

In the preferred form of my invention, I reinforce the side wall members 26 and 27 by flexible strips 28 and 29. The continuous one-piece member or strip 23 is preferably provided in two adjacent walls 36 and 37, and preferably comprising the walls adjacent to the stop blocks, with openings 30 and 31 for the reception and engagement of the housing bases 3' and 4' and for the passage of the shafts 1 and 2, while the opposite walls 38 and 39 are provided adjacent to the approaching or inwardly-moving corners with openings 32—33 for the lubricating fittings 34 and 35. Thus, the housing bases 3'—4' engage the adjacent walls of the cover and the lubricating fittings 34—35 engage the other two adjacent walls of the cover adjacent to said corner, so that upon a cambering of the sides 26 and 27 and a consequent movement of the corners 23 and 24 toward each other, the corners 21 and 22 will form flexible hinges which compensate and move outwardly upon the movement of the gear-assembly within the same. This movement occurs because of the engagement of such walls 36 and 37 adjacent to the joints 23 and 24 with the housing bases 3'—4'. The cover is normally cubical and is preferably applied to the joint when the parts thereof are positioned at right angles to each other as shown in Figs. 1, 2 and 4, and while the joint parts are also positioned at right angles to each other. When the gear members are moved into parallel enmeshed relationship with each other, the opposite side walls 38 and 39 will, because of their engagement with the lubricating members 34 and 35 as well as because of the engagement of the adjacent walls with the members 3'—4', be caused to move inwardly toward each other and the corner 21—21', including the creased portion 21ᵃ will act as a pivot for said two walls 38 and 39 while the side-wall members 26 and 27 will be cambered as aforesaid; but the creased portion of the corner 21—21' itself will move or bulge outwardly, as more particularly shown at 21ᵃ in Figs. 3 and 5, it being understood that it is highly desirable for said corner of the cover to move or bulge outwardly instead of inwardly into contact with the gear members and housing walls. It will also be seen that these corners 21—21' and 22—22' are, in the preferred construction shown, positioned outside the arcuate line produced by the movement of the gear members and stop blocks within the cover.

In reinforcing the cover of the type specified, it is desirable to reinforce only in the direction of the two corners which act as outwardly-moving compensating joints for the cover structure, and therefore the reinforcing pieces 28 and 29 extend only in a diagonal direction toward said corners 21 and 22.

It is desirable to provide an entrance opening to the cover extending across one of the two compensating joints 21 and 22, and the angular movement of the stop-block corner 22 is much less than the movement of the gear-member corner 21 opposite to the angular opening of the gear members. I preferably provide an entrance-slit 39 extending from the opening 30 to the opening 31 and through and across the corner 22. As shown, a releasable flap 40 covering said entrance-slit 39 is fastened adjacent to its lower edge 41 to the peripheral member, and said flap is provided at its upper edge with fastening members 42 and 43 for connecting the same to the walls 36 and 37 of said peripheral member of the cover.

In order to insert the gear-assembly, the flap 40 will be unfastened at 41 and 43 (Fig. 1) from the cover. This will open the entrance slit 39 to permit the movement of the cover in its normal cubical condition over the assembly, so that the housing base members 3'—4' will project through the openings 30—31 and the fittings 34 and 35 will project through the openings 32 and 33 in the housing. Thereupon the flap is closed and the snap button connections 42 and 43 are fastened to completely enclose and cover the gear assembly. A reverse operation will, of course, release the cover from the gear-assembly and these operations of application and release of the cover from the gear-assembly may be accomplished in only a few seconds of time, which is comparable with other coverings that are laced in place and take many minutes to remove and apply.

Having described my invention, I claim:

1. A cover for a hinged-joint gear-assembly including housings and gear members having relative angular diametric opening and closing movements through an arc of 90°, comprising a hollow container formed of flexible material, enclosing said gear assembly and having adjacent peripheral walls connected together to form in the container an angular joint disposed opposite and outside the arc of movement of the hinged members of said gear assembly, said angular joint of the container having its hinge-axis movable outwardly and away from said gear members during the closing hinged movement of the housings and gear members, and said container being provided with openings for insertion and connection of said gear assembly thereto.

2. A cover for a hinged-joint gear-assembly including housings, gear members and stop-blocks having relative angular diametric opening and closing movements through arcs of 90°, comprising a hollow container formed of flexible material, enclosing said gear assembly and having adjacent peripheral walls connected together to form in the container an angular joint disposed opposite and outside the arc of movement of the angularly hinged members of said gear assembly, said angular joint of the container having its hinge-axis movable outwardly and away from said gear members during the closing hinged movement of the housings and gear members, said container having another angular joint formed between adjacent peripheral walls and disposed opposite to and outside the arc of movement of the stop-blocks of said gear assembly, and having its hinge-axis also movable outwardly and away from the said stop blocks during a closing movement thereof, and said container being provided with openings for insertion and connection of said gear assembly thereto.

3. A cover for a hinged-joint gear-assembly including housings, gear members and stop-blocks having relative angular diametric opening and closing movements through an arc of 90°, comprising a hollow container formed of flexible material, enclosing said gear assembly and having adjacent peripheral walls connected together to form in the container an angular joint disposed opposite and outside the arc of movement of the hinged members of said gear assembly, said angular joint of the container having its hinge-axis movable outwardly and away from said gear members during the closing hinged movement of the housings and gear members, said container having another angular joint formed between adjacent peripheral walls and disposed opposite to and outside the arc of movement of the stop-blocks of said gear assembly and having its hinge-axis also movable outwardly and away from the said gear assembly, said container being of parallelopiped conformation and having additional joints movable inwardly to approach each other during such opening and closing movement of the housings, gear members and stop-blocks, and said container being provided with openings for insertion and connection of said gear assembly.

4. A cover for a hinged-joint gear-assembly including housings and gear members having relative angular diametric opening and closing movements through an arc of 90°, comprising a hollow container formed of flexible material, enclosing said gear assembly and having at least two adjacent peripheral walls connected together to form an angular joint in the container disposed opposite and outside the arc of movement of the angularly hinged members of said gear assembly, said angular joint having its hinge-axis movable outwardly and away from said gear members during the closing hinged movement of the housings and gear members, said container being provided with openings for connection of said gear assembly thereto, said container having an entrance slit for insertion of said gear assembly and a closure for closing said slit comprising a flap having speedily-releasable fastening means.

ALOYSIUS J. QUINN.

REFERENCES CITED

The following references are of record in the file of this patent:

UNITED STATES PATENTS

| Number | Name | Date |
| --- | --- | --- |
| 1,352,019 | Murphy | Sept. 7, 1920 |